(12) United States Patent
Kim et al.

(10) Patent No.: US 11,305,266 B2
(45) Date of Patent: Apr. 19, 2022

(54) CATALYST AND MANUFACTURING METHOD THEREOF

(71) Applicants: HYUNDAI MOTOR COMPANY, Seoul (KR); Kia Motors Corporation, Seoul (KR); HEESUNG CATALYSTS CORPORATION, Shiheung-si (KR)

(72) Inventors: Young Jin Kim, Hwaseong-si (KR); Chang Hwan Kim, Seongnam-si (KR); Pyung Soon Kim, Suwon-si (KR); Eunseok Kim, Ansan-si (KR); Yong Sul Kim, Siheung-si (KR)

(73) Assignees: HYUNDAI MOTOR COMPANY, Seoul (KR); KIA MOTORS CORPORATION, Seoul (KR); HEESUNG CATALYSTS CORPORATION, Shiheung-si (KR)

(*) Notice: Subject to any disclaimer, the term of this patent is extended or adjusted under 35 U.S.C. 154(b) by 0 days.

(21) Appl. No.: 16/887,163

(22) Filed: May 29, 2020

(65) Prior Publication Data
US 2021/0205796 A1 Jul. 8, 2021

(30) Foreign Application Priority Data
Jan. 3, 2020 (KR) .................. 10-2020-0000833

(51) Int. Cl.
| | |
|---|---|
| *B01J 29/80* | (2006.01) |
| *B01J 29/76* | (2006.01) |
| *B01J 37/02* | (2006.01) |
| *B01J 37/04* | (2006.01) |
| *B01J 37/30* | (2006.01) |
| *B01J 35/00* | (2006.01) |
| *B01J 29/56* | (2006.01) |
| *B01J 37/10* | (2006.01) |
| *B01J 29/072* | (2006.01) |
| *B01J 29/06* | (2006.01) |
| *B01D 53/86* | (2006.01) |
| *B01D 53/94* | (2006.01) |

(52) U.S. Cl.
CPC ............. *B01J 29/80* (2013.01); *B01J 29/072* (2013.01); *B01J 29/56* (2013.01); *B01J 29/763* (2013.01); *B01J 29/7607* (2013.01); *B01J 35/0006* (2013.01); *B01J 37/0201* (2013.01); *B01J 37/04* (2013.01); *B01J 37/10* (2013.01); *B01J 37/30* (2013.01); *B01D 53/8628* (2013.01); *B01D 53/9418* (2013.01); *B01D 2255/20761* (2013.01); *B01D 2255/50* (2013.01); *B01D 2257/40* (2013.01); *B01D 2257/404* (2013.01); *B01D 2258/01* (2013.01); *B01D 2258/012* (2013.01); *B01J 2029/062* (2013.01); *B01J 2229/186* (2013.01); *B01J 2229/40* (2013.01)

(58) Field of Classification Search
CPC .... B01J 35/0006; B01J 37/04; B01J 37/0201; B01J 37/30; B01J 2229/40; B01J 2229/186; B01J 2029/062; B01J 29/064; B01J 29/072; B01J 29/763; B01J 29/56; B01J 29/7607; B01J 29/80; B01D 53/8628; B01D 53/9418; B01D 2255/20761; B01D 2255/50; B01D 2257/40; B01D 2257/404; B01D 2258/01; B01D 2258/012
USPC ...................... 502/60, 63, 64, 74, 66, 67, 69
See application file for complete search history.

(56) References Cited

U.S. PATENT DOCUMENTS

| | | | | |
|---|---|---|---|---|
| 9,126,180 | B2 * | 9/2015 | Fedeyko | B01J 29/763 |
| 9,486,792 | B2 * | 11/2016 | Mohanan | B01J 37/0246 |
| 10,799,854 | B2 * | 10/2020 | Kim | B01J 35/0006 |
| 2009/0196812 | A1 * | 8/2009 | Bull | B01J 35/1023 |
| | | | | 423/239.1 |
| 2011/0300042 | A1 * | 12/2011 | Bull | B01D 53/9477 |
| | | | | 423/213.2 |
| 2013/0136677 | A1 * | 5/2013 | Chandler | B01J 29/7615 |
| | | | | 423/213.5 |
| 2014/0170045 | A1 * | 6/2014 | Fedeyko | B01D 53/56 |
| | | | | 423/237 |
| 2015/0118134 | A1 * | 4/2015 | Marin | B01J 29/85 |
| | | | | 423/213.7 |
| 2017/0095804 | A1 * | 4/2017 | Janssens | B01J 29/24 |
| 2017/0209857 | A1 * | 7/2017 | Chandler | B01J 29/763 |
| 2018/0346341 | A1 * | 12/2018 | Martin Garcia | B01J 29/76 |
| 2019/0015783 | A1 * | 1/2019 | Bull | B01D 53/9418 |

FOREIGN PATENT DOCUMENTS

| | | | |
|---|---|---|---|
| KR | 10-2017-0095118 A | | 8/2017 |
| WO | WO 2008/106579 | * | 9/2008 |
| WO | WO 2015/084834 | * | 6/2015 |

OTHER PUBLICATIONS

Kwak, Ja Hun et al., *Effects of hydrothermal aging on NH3-SCR reaction over Cu/zeolites*, Journal of Catalysts, 287 (2012) pp. 203-209.

* cited by examiner

*Primary Examiner* — Elizabeth D Wood
(74) *Attorney, Agent, or Firm* — McDonnell Boehnen Hulbert & Berghoff LLP (57) ABSTRACT

The present disclosures relate to a catalyst for removing a nitrogen oxide and a manufacturing method thereof, and the catalyst for removing the nitrogen oxide includes: a first catalyst that includes a zeolite support containing copper and having a first framework; and a second catalyst that is physically mixed with the first catalyst and includes a zeolite support containing copper and having a second framework different from the first framework.

8 Claims, 6 Drawing Sheets

CATALYST AND MANUFACTURING METHOD THEREOF

CROSS-REFERENCE TO RELATED APPLICATION

This application claims priority to and the benefit of Korean Patent Application No. 10-2020-0000833 filed on Jan. 3, 2020, the entire contents of which are incorporated herein by reference.

FIELD

The present disclosure relates to a catalyst and a manufacturing method thereof.

BACKGROUND

The statements in this section merely provide background information related to the present disclosure and may not constitute prior art.

Generally, an exhaust gas of a diesel vehicle includes carbon monoxide, hydrocarbons, and nitrogen oxides, which are hazardous substances. The carbon monoxide and the hydrocarbons cause relatively few problems, but nitrogen oxides cause environmental problems such as photochemical smog and acid rain, and human disease. Therefore, there is a demand for engine improvement and developing a technology for treating exhaust gas.

The most effective method for removing a nitrogen oxide is a selective catalytic reduction (SCR) method. The method is being developed according to reducing agents such as ammonia ($NH_3$), urea, and hydrocarbons, and various catalysts. Of the method using the listed reducing agents, a selective catalytic reduction method using ammonia ($NH_3$) as the reducing agent is the most effective for removing a nitrogen oxide from a stationary source such as a power plant and an incinerator. However, due to issues arising from the storage, transportation and use of ammonia when applied to a vehicle, a moving source, a method of using urea that can easily decompose into ammonia through thermal decomposition and hydration, as a reducing agent, has been developed.

Meanwhile, zeolite-based catalysts such as copper (Cu)/zeolite having an excellent characteristic as catalysts applied to the selective catalytic reduction method are being mainly researched and developed.

The above information disclosed in this Background section is only for enhancement of understanding of the background of the present disclosure, and therefore it may contain information that does not form the prior art that is already known to a person of ordinary skill in the art.

SUMMARY

The present disclosure provides a catalyst for removing a nitrogen oxide, and a manufacturing method thereof, with excellent heat resistance, high temperature durability, and excellent nitrogen oxide conversion ratio at a low temperature, while reducing $N_2O$ formation.

One form of the present disclosure provides a catalyst for removing a nitrogen oxide, including: a first catalyst that includes a zeolite support containing copper and having a first framework; and a second catalyst that is physically mixed with the first catalyst and includes a zeolite support containing copper and having a second framework different from the first framework.

Another form of the present disclosure provides a method for manufacturing a catalyst for removing a nitrogen oxide, including: preparing a first catalyst by supporting Cu on a zeolite support having a first framework by using an ion exchange method or a wet impregnation method; preparing a second catalyst by supporting Cu on a zeolite support having a second framework different from the first framework by using an ion exchange method or a wet impregnation method; and physically mixing the first catalyst and the second catalyst.

Another form of the present disclosure provides a method for manufacturing a catalyst for removing a nitrogen oxide, including: physically mixing a zeolite support having a first framework and a support having a second framework different from the first framework to prepare a mixture; and supporting copper on the mixture by using an ion exchange method or wet impregnation method.

The catalyst of the present form has excellent heat resistance and high temperature durability.

In addition, the catalyst of the present form may significantly improve nitrogen oxide conversion at a low temperature, while simultaneously reducing $N_2O$ formation.

DRAWINGS

To better understand the disclosure, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

Advantages and features of the present disclosure and methods of accomplishing the same may be understood more readily by reference to the following detailed description of implementations of the present disclosure and the accompanying drawings. The present disclosure is not limited to the variations of the present disclosure described hereinafter, and may be embodied in many different forms. The following variations of the present disclosure, given by way of examples, are provided to make the present disclosure complete and to allow those skilled in the art to clearly understand the scope of the present disclosure. The present disclosure is defined only by the scope of the appended claims. Throughout the specification, the same reference numerals denote the same constituent elements.

When referring to a part as being "on" or "above" another part, it may be positioned directly on or above another part, or another part may be interposed therebetween. In contrast, when referring to a part as being "directly above" another part, no other part is interposed therebetween.

In some variations of the present disclosure, detailed description of well-known technologies will be omitted to prevent the disclosure of the present disclosure from being interpreted ambiguously. Unless otherwise defined, all terms (including technical and scientific terms) used herein have the same meaning as is commonly understood by one of ordinary skill in the art. In the present specification, unless explicitly described to the contrary, the word "comprise" and variations such as "comprises" or "comprising" will be understood to imply the inclusion of stated elements but not the exclusion of any other elements. Further, as used herein, the singular forms "a", "an", and "the" are intended to include the plural forms as well, unless the context clearly indicates otherwise.

A catalyst for removing a nitrogen oxide according to one form of the present disclosure includes a first catalyst that includes a zeolite support containing copper and having a first framework, and a second catalyst that is physically mixed with the first catalyst and includes a zeolite support containing copper and having a second framework different from the first framework.

The first framework of the first catalyst may be, for example, at least one of LTA, CHA, AEI, AFX, KFI, LEV, ERI, DDR, or MER.

In the first catalyst, a molar ratio of SI/Al may be 1 to 100.

In addition, a molar ratio of Cu/Al in the first catalyst may be 0.1 to 0.5.

Furthermore, the Cu content in the first catalyst may be 1 to 5 wt % based on the entire first catalyst.

The second framework of the second catalyst may be, for example, at least one of LTA, CHA, AEI, AFX, KFI, LEV, ERI, DDR, or MER.

In the second catalyst, a molar ratio of Si/Al may be 1 to 100.

In the second catalyst, a molar ratio of Cu/Al may be 0.1 to 0.5.

In addition, the Cu content in the second catalyst may be 1 to 5 wt % based on the entire second catalyst.

A mixed ratio of the first catalyst and the second catalyst may be in a range of 5:1 to 1:3 as a weight ratio.

The nitrogen oxide catalyst according to one form of the present disclosure may further include a third catalyst that includes a zeolite support containing copper and having a third framework different from the first and second frameworks.

In this case, a mixed ratio of the first, second, and third catalysts may be in a range of 10:1:1 to 1:1:6 as a weight ratio.

The third framework may be, for example, at least one of LTA, CHA, AEI, AFX, KFI, LEV, ERI, DDR, or MER.

In the third catalyst, a molar ratio of Cu/Al may be in a range of 0.1 to 0.5.

In addition, the Cu content in the third catalyst may be 1 to 5 wt % based on the entire third catalyst.

A mass-produced catalyst widely applied to the current SCR technology is a Cu/CHA (Cu/SSZ13) catalyst having a chabazite structure. The Cu/CHA (Cu/SSZ13) catalyst prepared by ion-exchanging Cu in zeolite has excellent NOx purification performance and heat resistance.

However, we have discovered that at a temperature of 800° C. or more the structure of the Cu/CHA catalyst collapses, which significantly lowers the percentage of nitrogen oxide conversion. That is, when the Cu/CHA catalyst is exposed to a high temperature rich condition (for example, an LNT desulfurization condition), the percentage of nitrogen oxide conversion at a high temperature is sharply lowered.

As an alternative, instead of the Cu/CHA catalyst, a Cu/LTA catalyst has been proposed for having excellent heat resistance and excellent durability even at a high temperature and rich condition. However, the Cu/LTA catalyst has relatively low performance at a low temperature under a mild aging condition, and has a high formation ratio of $N_2O$.

Therefore, the inventors of the present disclosure conducted many studies in order to develop a catalyst that may have excellent heat resistance and high temperature durability, greatly improve a conversion ratio of a nitrogen oxide at a low temperature, and reduce $N_2O$ formation, thereby accomplishing the present disclosure.

That is, the catalyst for removing the nitrogen oxide according to one form of the present disclosure has excellent heat resistance similar to that of the Cu/LTA catalyst and excellent durability even in a high temperature rich environment. In addition, it may have excellent nitrogen oxide conversion at a low temperature and may significantly reduce $N_2O$ formation.

Figure 1:
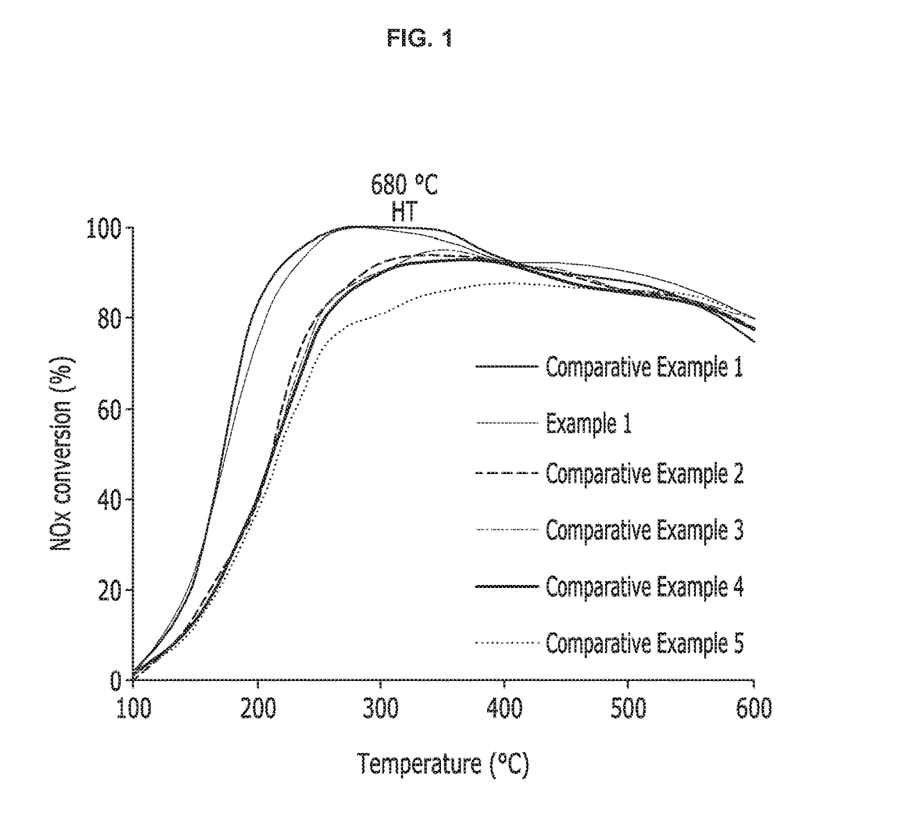
FIG. 1 illustrates nitrogen oxide purification performance of Example 1 and Comparative Examples 1 to 5 by temperatures after hydrothermal aging at 680° C.
Figure 2:
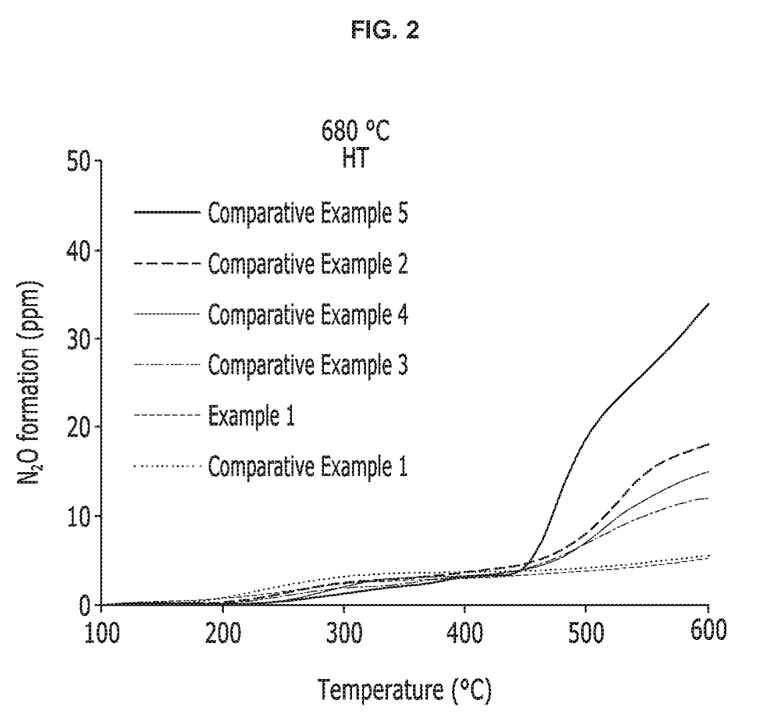
FIG. 2 illustrates a formation ratio of $N_2O$ that is a by-product formed in a nitrogen oxide purification process of FIG. 1.

FIG. 1 illustrates nitrogen oxide purification performance by temperature after hydrothermal aging at 680° C. with respect to catalysts according to Example 1 and Comparative Examples 1 to 5, and FIG. 2 illustrates a formation ratio of $N_2O$, a by-product formed in a nitrogen oxide purification process of FIG. 1.

Here, Comparative Example 1 is a Cu/CHA catalyst, Comparative Example 2 is a catalyst composed of a Cu/LTA catalyst and a Cu/CHA catalyst in a dual brick form, Comparative Example 3 is a catalyst composed of a Cu/LTA catalyst and a Cu/CHA catalyst in a double layer form, Comparative Example 4 is a catalyst composed of a Cu/LTA catalyst and a Cu/CHA catalyst in a zoning form, and Comparative Example 5 is a Cu/LTA catalyst.

In addition, as one form of the present disclosure, Example 1 is a catalyst in which Cu/LTA catalyst, as a first catalyst, and Cu/CHA catalyst, as a second catalyst, are physically mixed in a 7:3 weight ratio.

More specifically, the Cu/LTA and Cu/CHA catalysts used in Comparative Examples 1 to 5 and Example 1 were prepared by mixing the Cu/LTA catalyst of 3 wt % in powder form and the Cu/CHA catalyst of 2.4 wt % in powder form. In this case, a molar ratio of SI/Al in each catalyst was 16.

The catalysts of Example 1 and Comparative Examples 1 to 5 were prepared as core size samples (1 in.×2 in.) and evaluated in the following manner.

After filling the prepared sample into a reactor, a reaction gas containing 500 ppm (transient) or 2000 ppm (steady-state) of $NH_3$, 500 ppm of NO, 9.5 vol % of $O_2$, 5 vol % of $CO_2$, 5 vol % of $H_2O$, and the remainder $N_2$ was supplied at a space velocity of 50 $kh^{-1}$. In this case, a concentration of the gas was analyzed by a Fourier transform infrared spectroscopy (FTIR) device. In this case, a reaction temperature and time was adjusted to one of transient (100° C.-600° C., 10° C./min) and steady-state (600° C., 640° C.).

Next, after performing hydrothermal aging for 25 hours at 10% of $H_2$/air and 680° C., the nitrogen oxide (NOx) conversion of an exhaust gas passing through the catalyst was measured according to a reaction temperature between 100° C. and 600° C. and a formation ratio of $N_2O$, a byproduct during the nitrogen oxide purification reaction, was measured.

Referring to FIG. 1, it can be seen that the catalyst according to Example 1 in which the Cu/LTA and the Cu/CHA catalysts are physically mixed at a weight ratio of 7:3 has a similar percentage of nitrogen oxide conversion to that of Comparative Example 1, which is the Cu/CHA catalyst.

In addition, it can be seen that the nitrogen oxide conversions of the Cu/LTA catalysts, which are catalysts of Comparative Example 5 and Example 1, were 38% and 76%, respectively, at 200° C., and thus the NOx purification ratio of Example 1 was about twice that of Comparative Example 5. This is regarded to be a synergistic effect caused by contact between particles.

In addition, it can also be seen that the same level of effect does not appear in the catalysts of Comparative Examples 2 to 4 composed by another catalyst composition method such as a dual brick, double layer, or zoning method.

Meanwhile, referring to FIG. 2, it can be seen that the $N_2O$ formation ratio of the catalyst of Example 1 was similar to that of Comparative Example 1 while greatly reduced compared to that of Comparative Example 5. In addition, it can be seen that the amount of the $N_2O$ formation in Comparative Examples 2 to 4 was not reduced to the same level as in Example 1.

Figure 3:
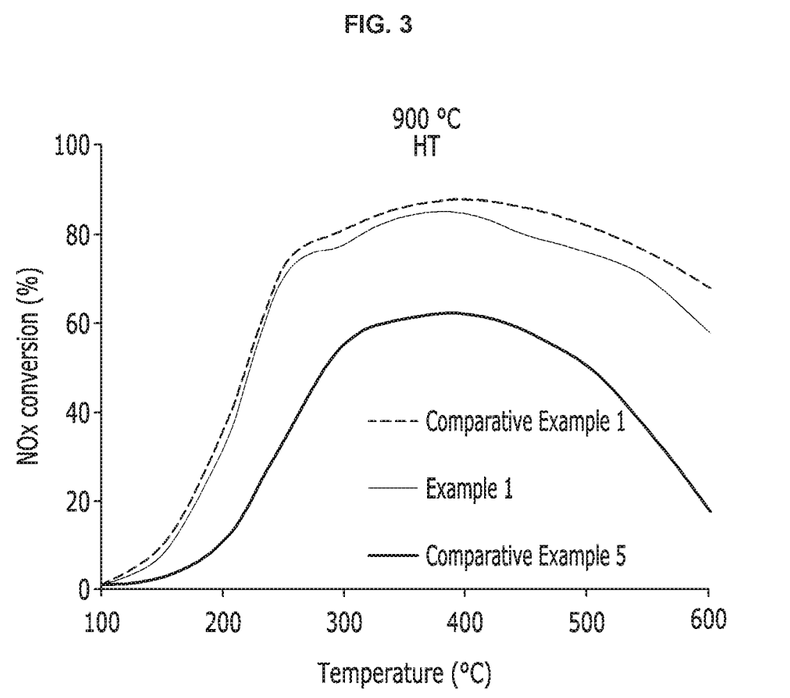
FIG. 3 illustrates the percentage of nitrogen oxide conversion of catalysts of Comparative Example 1, Comparative Example 5, and Example 1 after performing hydrothermal aging at 900° C.

FIG. 3 illustrates results of measuring nitrogen oxide conversion after performing hydrothermal aging at 900° C. with respect to catalysts of Comparative Example 1, Comparative Example 5, and Example 1.

Specifically, the hydrothermal aging was performed at 10% of $H_2$/air, 900° C. for 12 hours.

Referring to FIG. 3, it can be seen that the catalyst according to Example 1 in which the Cu/LTA and the Cu/CHA catalysts are physically mixed at a weight ratio of 7:3 has a similar nitrogen oxide conversion similar to that of Comparative Example 5, which is the Cu/LTA catalyst, during the entire temperature range. In contrast, it can be seen that the nitrogen oxide conversion of Comparative Example 1, which is the Cu/CHA catalyst, was significantly lower than that of Example 1 throughout the entire temperature range after the hydrothermal aging at high temperature.

Figure 4:
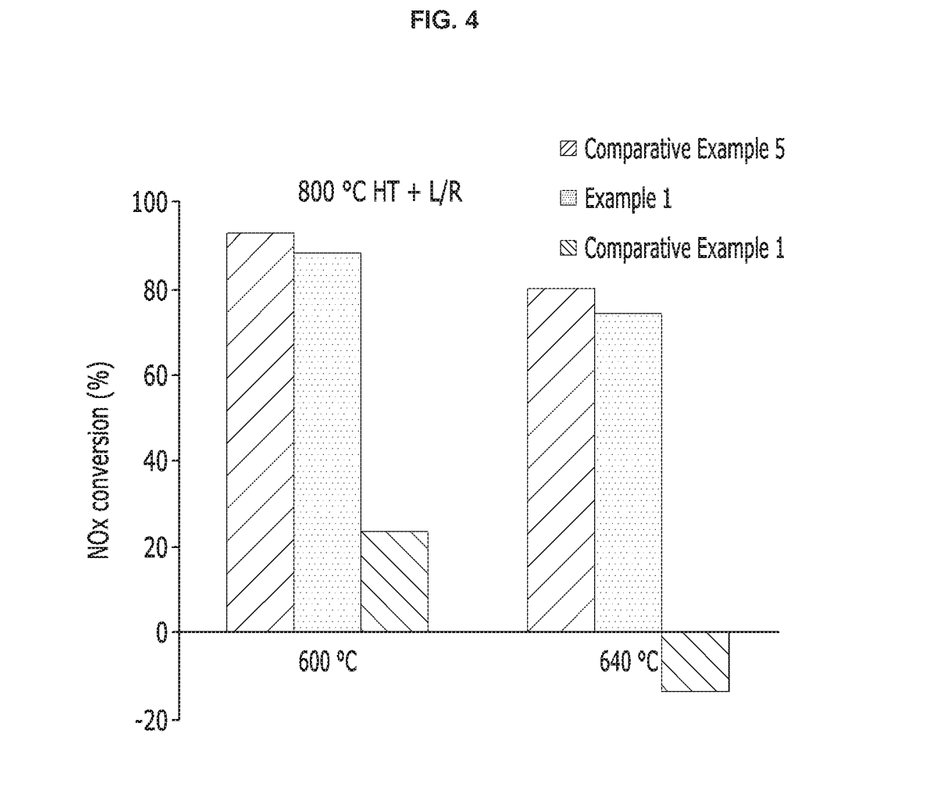
FIG. 4 illustrates the percentage of nitrogen oxide conversion at a reaction temperature of 600° C. of catalysts of Comparative Example 1, Comparative Example 5, and Example 1 after performing hydrothermal aging at 800° C. and lean/rich aging.
Figure 5:
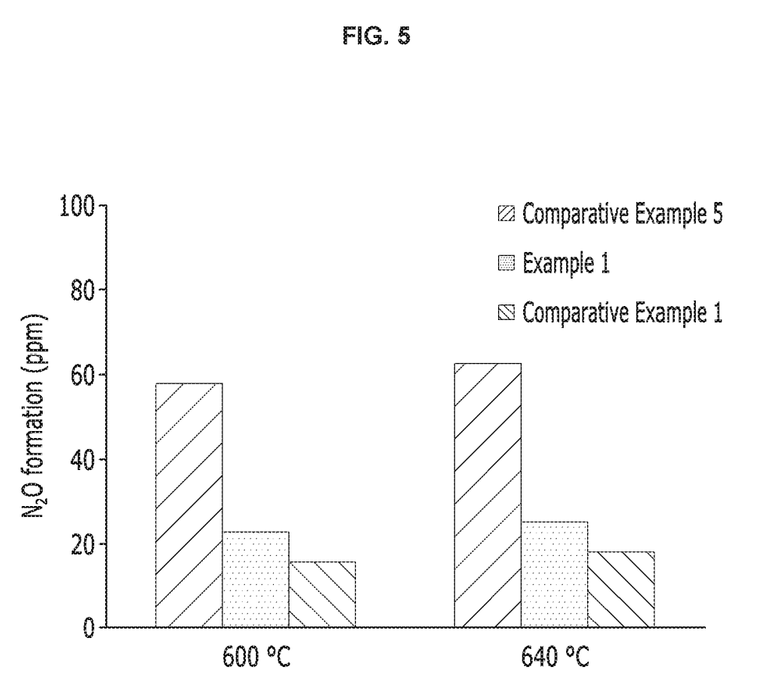
FIG. 5 illustrates a formation ratio of $N_2O$ formed as a by-product in a nitrogen oxide purification process of FIG. 4.

FIG. 4 illustrates results of measuring nitrogen oxide conversion of Comparative Examples 1 and 5 and Example 1 at a reaction temperature of 600° C. after performing hydrothermal aging at 800° C. and also after performing lean/rich aging. FIG. 5 illustrates a formation ratio of $N_2O$, a by-product formed in the nitrogen oxide purification process of FIG. 4.

Specifically, the hydrothermal aging was performed at 10% of $H_2$/air, 800° C. for 16 hours.

Next, lean/rich aging was performed at 620° C. for 4 hours, and during the cycle of the lean/rich aging, a lean portion was performed at λ: 2.00, 20 s, and a rich portion was performed at λ: 0.91, 12 s.

Referring to FIG. 4, it can be seen that the nitrogen oxide conversion of the catalyst according to Example 1 at a reaction temperature of 600° C. or 640° C. was similar to that of Comparative Example 5 and was 70% or more than that of Comparative Example 1.

In addition, referring to FIG. 5, it can be seen that the amount of $N_2O$ formation of the catalyst according to Example 1 at each reaction temperature was similar to that of Comparative Example 1 while significantly reduced compared to Comparative Example 5.

That is, it can be seen that the catalyst according to one form of the present disclosure has all the advantages of the Cu/CHA catalyst and the Cu/LTA catalyst.

Figure 6:
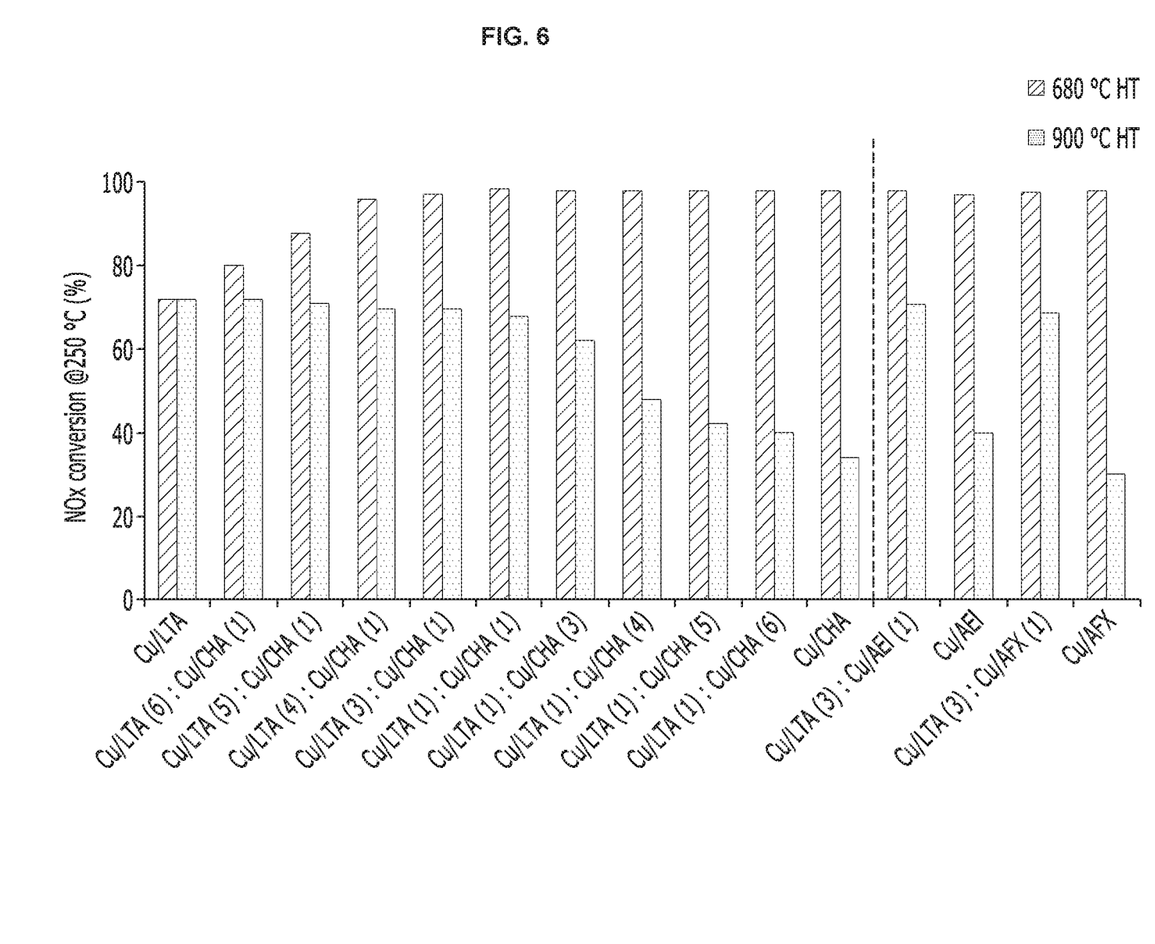
FIG. 6 illustrates nitrogen oxide purification ratios at a reaction temperature of 250° C. after performing hydrothermal aging at 680° C. and 900° C. of a catalyst in which a Cu/LTA catalyst, a Cu/CHA catalyst, a Cu/AEI catalyst, a Cu/AFX catalyst, a Cu/LTA catalyst, and a Cu/CHA catalyst are mixed at a weight ratio of 6:1 to 1:6; a catalyst in which a Cu/LTA catalyst and a Cu/AEI catalyst are mixed at a weight ratio of 3:1; and a catalyst in which a Cu/LTA catalyst and a Cu/AFX catalyst are mixed at a weight ratio of 3:1.

FIG. 6 illustrates nitrogen oxide purification ratios at a reaction temperature of 250° C. after performing hydrothermal aging at 680° C. and 900° C. with respect to a catalyst in which a Cu/LTA catalyst, a Cu/CHA catalyst, a Cu/AEI catalyst, a Cu/AFX catalyst, a Cu/LTA catalyst, and a Cu/CHA catalyst are mixed at a weight ratio of 6:1 to 1:6; a catalyst in which a Cu/LTA catalyst and a Cu/AEI catalyst are mixed at a weight ratio of 3:1; and a catalyst in which a Cu/LTA catalyst and a Cu/AFX catalyst are mixed at a weight ratio of 3:1.

Referring to FIG. 6, after performing the hydrothermal aging at 680° C., the nitrogen oxide purification ratio increases as the Cu/CHA ratio increases, and after performing the hydrothermal aging at 900° C., the nitrogen oxide purification ratio increases as the Cu/LTA ratio increases.

Considering this comprehensively, it can be seen that the nitrogen oxide purification ratio is excellent when the mixed weight ratio of the first catalyst and the second catalyst is in the range of 5:1 to 1:3, as in one form of the present disclosure.

In addition, it can be seen that a catalyst with the Cu/LTA catalyst, as the first catalyst, and the Cu/AEI or Cu/AFX catalyst, as the second catalyst, having a framework different from that of the first catalyst mixed at a weight ratio of 3:1, has an effect similar to that of a catalyst in which the Cu/LTA and Cu/CHA catalysts are mixed.

A method for manufacturing a catalyst for removing a nitrogen oxide according to another variation of the present disclosure includes: preparing a first catalyst by supporting Cu on a zeolite support having a first framework by using an ion exchange method or a wet impregnation method; preparing a second catalyst by supporting Cu on a zeolite support having a second framework, different from the first framework, by using an ion exchange method or a wet impregnation method; and physically mixing the first catalyst and the second catalyst.

In this case, the mixed ratio of the first catalyst and the second catalyst may be in a range of 5:1 to 1:3 as a weight ratio.

The first catalyst and the second catalyst may be physically mixed by adding a catalyst which is supported with copper and includes a zeolite support having a third framework different from that of the supports having the first and second frameworks.

In this case, a mixed ratio of the first catalyst, the second catalyst, and the third catalyst may be in a range of 10:1:1 to 1:1:6 as a weight ratio.

A specific feature of each catalyst in the present form is the same as those described in the embodiment, which will be omitted herein.

Alternatively, a method for manufacturing a catalyst for removing a nitrogen oxide according to another embodiment includes: physically mixing a zeolite support having a first framework and a support having a second framework different from the first framework to prepare a mixture; and supporting copper on the mixture by using an ion exchange method or wet impregnation method.

A mixed ratio of the zeolite support having the first framework and the support having the second framework different from the first framework may be in a range of 5:1 to 1:3 as a weight ratio.

The mixture may be prepared by adding a support having a third framework different from the first and second frameworks.

A mixed ratio of the supports having the first to third frameworks may be in a range of 10:1:1 to 1:1:6 as a weight ratio.

The specific feature of each catalyst in the present disclosure is the same as those previously described above, and therefore will be omitted herein.

While the variations of the present disclosure have been described hereinbefore, it will be understood by those skilled in the art that various changes in form and details may be made thereto without departing from the technical spirit and desired features of the present disclosure.

What is claimed is:

1. A catalyst for removing a nitrogen oxide, comprising:
    a first catalyst that includes a zeolite support containing copper and having a first framework; and
    a second catalyst that is physically mixed with the first catalyst and includes a zeolite support containing copper and having a second framework different from the first frameworks
    wherein the first framework is LTA;
    wherein the second framework is at least one of CHA, AEI, and AFX; and
    wherein a mixed ratio of the first catalyst and the second catalyst is in a range of 5:1 to 1:3 as a weight ratio.

2. The catalyst for removing the nitrogen oxide of claim 1, wherein a molar ratio of Si/Al in each of the first catalyst and the second catalyst is 1 to 100.

3. The catalyst for removing the nitrogen oxide of claim 1, wherein a molar ratio of Cu/Al in each of the first catalyst and the second catalyst is 0.1 to 0.5.

4. The catalyst for removing the nitrogen oxide of claim 1, wherein a content of Cu in each of the first catalyst and the second catalyst is 1 wt % to 5 wt %.

5. The catalyst for removing the nitrogen oxide of claim 1, further comprising
    a third catalyst that includes a zeolite support containing copper and having a third framework different from the first and second frameworks.

6. The catalyst for removing the nitrogen oxide of claim 5, wherein a mixed ratio of the first catalyst, the second catalyst, and the third catalyst is in a range of 10:1:1 to 1:1:6 as a weight ratio.

7. The catalyst for removing the nitrogen oxide of claim 5, wherein a molar ratio of Cu/Al in the third catalyst is in a range of 0.1 to 0.5.

8. The catalyst for removing the nitrogen oxide of claim 5, wherein a content of Cu in the third catalyst is 1 wt % to 5 wt %.

* * * * *